United States Patent [19]

Balleys

[11] Patent Number: 4,598,190

[45] Date of Patent: Jul. 1, 1986

[54] METHOD AND APPARATUS FOR MACHINING A WORKPIECE IN A TRAVELLING WIRE EDM APPARATUS

[75] Inventor: François Balleys, Petit-Lancy, Switzerland

[73] Assignee: Charmilles Technologies, S.A., Geneva, Switzerland

[21] Appl. No.: 486,381

[22] Filed: Apr. 19, 1983

[30] Foreign Application Priority Data

Apr. 22, 1982 [CH] Switzerland .................. 2435/82

[51] Int. Cl.⁴ .................... B23H 1/02; B23H 7/04
[52] U.S. Cl. .................... 219/69 W; 204/129.7; 219/69 V; 219/69 M; 219/69 C
[58] Field of Search ............. 219/69 W, 69 P, 69 V, 219/69 M, 69 C, 69 G; 204/129.7, 222

[56] References Cited

U.S. PATENT DOCUMENTS

| | | | |
|---|---|---|---|
| 3,832,510 | 8/1974 | Pfau et al. ............... | 219/69 C |
| 3,832,511 | 8/1974 | Bell, Jr. et al. ............ | 219/69 C |
| 3,849,624 | 11/1974 | Dulebohn et al. ......... | 219/69 W |
| 4,081,652 | 3/1978 | Janicke et al. ............ | 219/69 W |
| 4,292,491 | 9/1981 | Tanaka et al. ............ | 219/69 W |
| 4,320,280 | 3/1982 | Inoue ..................... | 219/69 W |
| 4,324,970 | 4/1982 | Nanasawa et al. ......... | 219/69 W |
| 4,358,655 | 11/1982 | Inoue ..................... | 219/69 W |

FOREIGN PATENT DOCUMENTS

| | | | |
|---|---|---|---|
| 28926 | 5/1981 | European Pat. Off. ...... | 219/69 C |
| 38658 | 10/1981 | European Pat. Off. ...... | 219/69 G |
| 54-109698 | 8/1979 | Japan ..................... | 219/69 W |
| 55-164442A | 12/1980 | Japan ..................... | 219/69 W |
| 56-39827 | 4/1981 | Japan ..................... | 219/69 V |
| 2067118A | 7/1981 | United Kingdom ......... | 219/69 V |
| 2068816A | 8/1981 | United Kingdom ......... | 219/69 M |

*Primary Examiner*—Clarence L. Albritton
*Assistant Examiner*—Geoffrey S. Evans
*Attorney, Agent, or Firm*—Hauke & Patalidis

[57] ABSTRACT

A travelling wire EDM apparatus wherein a workpiece is cut by electrical discharges by a travelling wire electrode, relative motion of the workpiece and the wire electrode being controlled by a numerical control unit which, in addition, controls transverse oscillations of the electrode wire relative to the workpiece along the cutting path. The energy of the electrical discharges is varied as a function of the amplitude of the transverse oscillations of the electrode wire relative to the workpiece such as to obtain maximum electrical discharge energy when the amplitude of vibration of the electrode wire is at a minimum and minimum energy when the amplitude of vibration of the electrode wire is at a maximum. The invention permits to achieve a good surface finish on the machined surface of the workpiece corresponding to the peak of the transverse electrode wire oscillation displacement being reached simultaneously with minimum electrical discharge energy, and thus achieves rough cutting and finish cutting of the workpiece in a single pass.

9 Claims, 6 Drawing Figures

METHOD AND APPARATUS FOR MACHINING A WORKPIECE IN A TRAVELLING WIRE EDM APPARATUS

BACKGROUND OF THE INVENTION

The present invention relates to a method and apparatus for cutting by electrical discharges an electrode workpiece by means of a longitudinally fed electrode wire, and more particularly the present invention relates to such a method and apparatus wherein the electrode workpiece and the electrode wire are displaced relative to each other not only according to a predetermined cutting path but also according to an oscillatory motion directed transversely to the cutting path.

Cutting a metallic workpiece in a travelling wire EDM apparatus, by means of an electrode wire of a few tenths of a millimeter in diameter, presents many important problems due to the narrowness of the slit cut in the workpiece, more particularly problems relating to eliminating the machining debris from the machining zone and to maintaining the electrode wire straight between the wire support and guide members. Straightness of the electrode wire in the machining zone is difficult to achieve in view of the forces of attraction and repulsion exerted upon the wire in the course of the electrical discharge machining.

In order to partially solve such problems, it is known to oscillate the wire in a direction transverse to the direction of the cutting path, for example as disclosed in U.S. Pat. No. 2,794,110. There results an increase in width of the slit cut in the workpiece, which greatly improves the disposal of the machining debris and decreases the forces of repulsion exerted on the wire. Such a known method which permits up to a certain point to decrease short circuits and to improve the cooling of the wire, presents advantages only for fast cuts providing a rough surface finish. This in turn requires that a second machining operation, a finish machining operation, be effected on the rough machined surface of the workpiece by effecting a second cutting pass at a much lower machining rate. The second machining operation is time consuming and greatly increases the total costs of the machining operation.

SUMMARY OF THE INVENTION

The present invention has for principal object to shorten considerably the total time required for machining the workpiece by effecting the finish machining pass simultaneously with the rough cutting pass. The method of the invention is particularly characterized in that it consists in controlling the instantaneous amplitude of the lateral oscillations of the electrode wire, and increasing the electrical discharge energy to a minimum value as a function of an increase in oscillation amplitude, and to decrease the electrical discharge energy as a function of the decrease in oscillation amplitude.

The present invention also provides an apparatus for practicing the method of the invention.

The present invention will be best understood by those skilled in the art when the following description of the best mode contemplated for practicing the invention is read in conjunction with the accompanying drawing showing, in a schematic manner and for illustrative purpose only, an example of structure for practicing the present invention. In the accompanying drawing:

DETAILED DESCRIPTION OF THE PREFERRED EMBODIMENT

Figure 1:
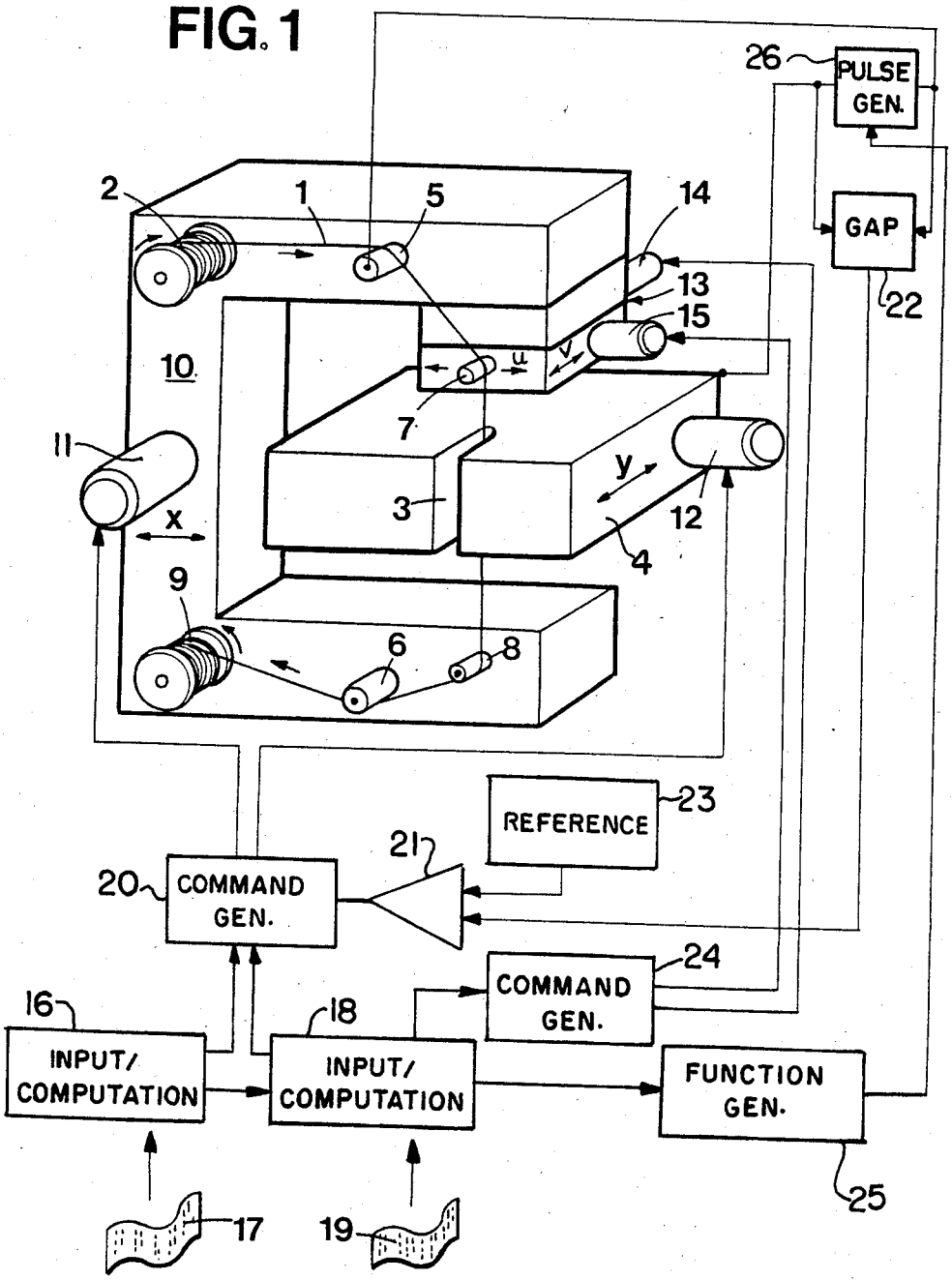
FIG. 1 is a schematic representation of an apparatus for practicing the method of the invention.

In a travelling wire EDM apparatus, such as illustrated at FIG. 1, an electrode wire 1 is supplied from a spool 2 and is caused to pass through a machining zone forming a cut or slit 3 in a workpiece 4. The electrode wire 1 is held stretched between an upstream roller 5 and a downstream roller 6, an upstream guide member 7 and a downstream guide member 8 being provided one on one side of the workpiece 4, such as the top of the workpiece, and the other on the other side, such as the bottom of the workpiece. The used electrode wire is wound on a receiving reel or spool 9. The spools 2 and 9, the rollers 5 and 6 and the guide members 7 and 8 are supported by a generally C-shaped frame 10. The frame 10 and the electrode workpiece 4 are displaceable one relative to the other by way of servo motors 11 and 12, respectively effecting such relative displacement along two perpendicular X and Y axes. Such an arrangement permits, as is well known, to effectuate a cut through the electrode workpiece 4 by means of the electrode wire 1 according to a predetermined path and, in addition, to effectuate minute displacements, hereinafter referred to as "micro displacements", of the electrode wire 1 within the machining zone resulting in the slit 3 being cut in the workpiece 4. The micro displacements of the electrode wire 1 consist of a combination of individual micro displacements in a direction transverse to the cutting path and of individual micro displacements in a direction parallel to the cutting path, such as to form a micro trajectory, an example of which is illustrated schematically and graphically at FIG. 5. The micro displacements in the direction of the cutting path and the micro displacements in the direction transverse to the cutting path are co-ordinated according to a predetermined function, and the speed of each of the micro displacements is controlled such as to maintain predetermined machining conditions at the machining zone.

The EDM apparatus, FIG. 1, further comprises cross-slide u/v table 13 for displacing one of the wire guide members 7, for example, relative to the other guide member 8 by means of respectively servo motor 14 and servo motor 15 in two perpendicular directions or axes, u and v.

The EDM apparatus operates under the control of a numerical control unit providing command signals for effecting the relative displacement of the electrode workpiece and of the electrode wire guide members 7 and 8. A simplified machine numerical control unit is schematically represented in the block diagram portion of FIG. 1. As is well known in the machine numerical control art input data in the form of magnetic or perforated tape, manually dialed data or internal memory data is supplied to an input logic unit. The input logic unit accomplishes several functions including reading and decoding the program information data, temporarily storing the data, and performing any required mathematical function such as addition, subtraction, doubling, division and serial complementing to compute the necessary mathematical quantities to produce servo drive command signals to effectuate the required cut in the workpiece.

As schematically illustrated at FIG. 1, the numerical control for the EDM apparatus of the invention comprises a pair of input/computation logic units 16 and 18. The input/computation logic unit 16 determines the cutting path from the program information data encoded on a first data carrier 17, while the input/computation logic unit 18 processes the information data contained on a second data carrier 19, which relates to the micro displacement program of the electrode wire 1 relative to the workpiece 4. The logic signals at the output of the input/computation logic units 16 and 18 are supplied to inputs of a command generation unit 20 which in turn provides appropriate command signals, in the form of electrical pulses, to the servo motors 11 and 12, such command signals controlling both the relative motion of the electrode wire 1 and of the workpiece 4 along the X and Y axes providing both the normal cut trajectory and micro displacements in a direction transverse to the cutting path.

A signal representing the speed at which the cut is to be effected in the workpiece 4 is applied to another input of the command generation unit 20 from the output of a comparator 21, such signal being proportional to the difference between two signals applied to the inputs of the comparator 21. One signal represents the machining gap width, and is obtained from a gap monitoring unit 22, the gap width being a function of the average machining voltage, for example, or of the average delay of triggering of the electrical current discharges across the gap. The other signal applied to one of the inputs of the comparator 21 is a reference signal obtained from a reference value circuit 23, such as an adjustable voltage source, the reference signal being representative of a cutting speed pre-set, for example, by the machine operator.

The servo motors 14 and 15 of the u/v cross-slide table 13 are controlled by a command generation unit 24 which functions as a correcting circuit permitting to maintain a predetermined, but adjustable, ratio between the amplitudes of micro displacements of the upstream wire guide member 7 and of the downstream wire guide member 8, such as to provide the machined surface of the workpiece 4 with a slight inclination, or to correct machining defects.

In order to vary the energy of the electrical discharges as a function of the amplitude of the transverse micro displacements, the apparatus of the invention further comprises a function generator 25 and a pulse generator 26. The input/computation logic unit 18 instantaneously provides information data relating to the amplitude of the transverse micro displacements which is supplied to the pulse generator 26 through the function generator 25 for the purpose of decreasing the energy of the electrical discharges when the amplitude of the transverse micro displacements increases, and vice-versa. The energy of the electrical discharges may be varied by means of varying the peak current of the electrical discharges and/or the duration of each electrical discharge. The pulse generator described in U.S. Pat. No. 3,832,510 is particularly well adapted to accomplishing such a function. As illustrated at FIG. 6 which represents a diagram of the variation of the electrical discharge current I as a function of the amplitude A of the transverse micro displacement, the function may be progressive as shown by curve (a), or non-progressive as shown by curve (b).

Figure 2:
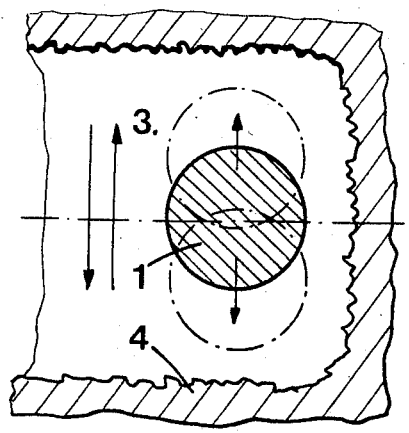
FIGS. 2 through 4 are sections across a slit cut in a workpiece and schematically illustrating particular machining characteristics.
Figure 5:
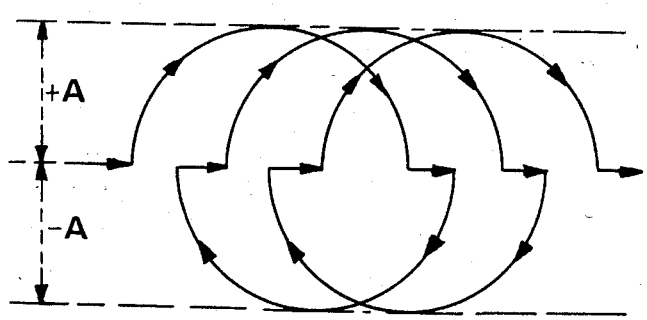
FIG. 5 is a schematic graphic illustration of the trajectory of the electrode wire.

FIG. 5 illustrates an example of the micro trajectory of the center of the electrode wire which is a resultant of linear displacements of the order of a few microns, such as for example 4 microns, followed by semi-circulr displacements around centers disposed at the centerline of the cutting path. Absent a modulation of the electrical discharge current as a function of the amplitude of the micro displacements, the cut 3 in the workpiece 4 is effected at a rapid rate but with a rough surface finish, as illustrated at FIG. 2.

Figure 3:
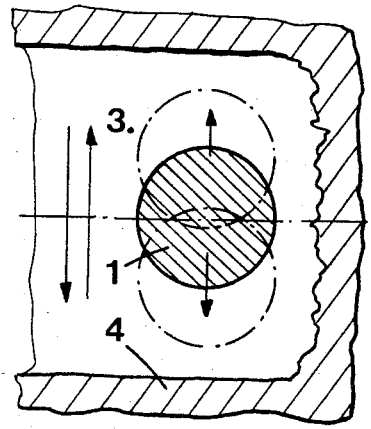
Figure 6:
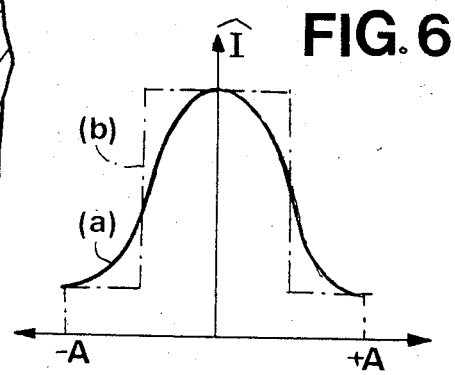
FIG. 6 is a diagram illustrating variations of machining current as a function of the amplitude of lateral displacement of the electrode wire, according to the present invention.

By varying the machining current I, as illustrated at FIG. 6, to a minimum value when the amplitude of the micro displacements, varying from $-A$ to $+A$, is at its maximum value, and vice-versa, the rough cut phase effected in the workpiece 4 with a high machining current, when the wire 1 occupies a mid position in the machined slit 3, alternates with a finish cut phase, characterized by a relatively low machining current, when the electrode wire 1 is oscillated to a close proximity with the lateral surfaces of the slit 3, corresponding to the maximum amplitude $+A$ and $-A$ of FIG. 6. The machining current is thus modulated according to an inverse function of the amplitude of the transverse micro displacements. FIG. 3 illustrates a cut effected according to the method of the invention which, in contrast with the rough cut shown at FIG. 2, provides a relatively smooth finish surface on each lateral walls of the slit 3 in the workpiece 4.

Figure 4:
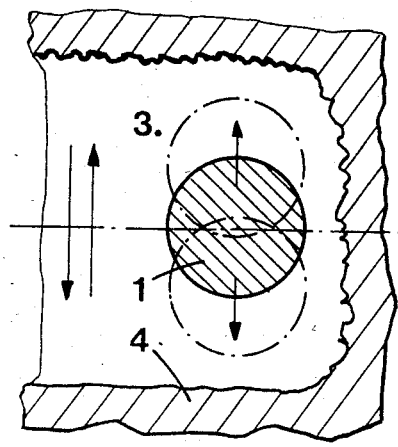

The function generator 25 of FIG. 1 can also be controlled such as to vary the energy of the electrical discharges only on one side of the slit 3 cut in the workpiece 4, such as to obtain a relatively smooth finish surface on only one lateral wall of the slit 3, as illustrated at FIG. 4.

It will be appreciated that the hereinabove described apparatus for practicing the present invention has been given as an example of structure subject to modifications by those skilled in the art while still remaining within the scope of the invention.

In particular, the method of the invention can be practiced by means of mechanisms, other than the one described, for oscillating the electrode wire in a transverse direction. For example, each electrode wire guide member 7 and 8 may be supported in out of center position on a rotating plate. By proper timing of the rotation of the support plates and by varying the energy of the electrical discharges as a function of the angular position of the rotating plates, similar results are achieved.

Other shapes of micro trajectory could be used, for example micro trajectories having a serrated or zig-zag shape, may be achieved by effecting transverse micro displacements in conjunction with linear micro displacements in the direction of cut, by means of predetermined simple or complex functions relating one motion to the other.

Furthermore, it is possible to modify the function relating the energy of electrical discharges to the amplitude of the transverse displacement according to the material being machined or the selected machining mode, or according to the quality of the results sought.

Having thus described the present invention by way of describing an apparatus particularly well adapted for practicing the method of the invention, modification whereof will be apparent to those skilled in the art, what is claimed as new is as follows:

1. In a method for effecting a cut in a conductive workpiece by electrical discharges of controllable energy by means of an electrode wire in a travelling wire EDM apparatus wherein the electrode wire and the workpiece are displaced relative to each other according to a cutting path of predetermined centerline, the improvement comprising oscillating said electrode wire and said workpiece relative to each other at a predetermined amplitude of oscillation on both sides of said centerline in a direction transverse to the cutting path centerline, monitoring the instantaneous value of the amplitude of each transverse oscillation, and automatically varying the energy of the electrical discharges as an inverse function of the instantaneous value of said amplitude such that rough machining of the cut in the workpiece is effected at a maximum value of said energy corresponding to a minimum instantaneous value of said amplitude and finish machining of at least one lateral wall of said cut in the workpiece is effected at a minimum value of said energy corresponding to a maximum instantaneous value of said amplitude, whereby rough machining of the workpiece and finish machining of at least said lateral wall of the cut in the workpiece are effected in a single pass.

2. The improvement of claim 1 wherein said varying of the energy of the electrical discharges to said minimum value corresponding to a maximum instantaneous value of said amplitude is effected in the course of a transverse oscillation on both sides of the centerline of the cut in said workpiece, whereby rough machining of the workpiece and finish machining of both lateral walls of the cut are effected in a single pass.

3. The improvement of claim 1 wherein said transverse oscillation is effected along substantially semi-circular paths centered on the centerline of the cutting path.

4. In a travelling wire EDM apparatus for effecting a cut by electrical discharges of controllable energy in a conductive workpiece by means of an electrode wire wherein the electrode wire and the workpiece are displaced relative to each other according to a cutting path of predetermined centerline, the improvement comprising means for oscillating said electrode wire and said workpiece relative to each other on both sides of said centerline at a predetermined amplitude of oscillation in a direction transverse to the cutting path centerline, means for monitoring the instantaneous value of the amplitude of each transverse oscillation, and means for automatically varying the energy of the electrical discharges as an inverse function of the instantaneous value of said amplitude such that rough machining of the cut in the workpiece is effected at a maximum value of said energy corresponding to a minimum instantaneous value of said amplitude and finish machining of at least one lateral wall of said cut in the workpiece is effected at a minimum value of said energy corresponding to a maximum instantaneous value of said amplitude, whereby rough machining of the workpiece and finish machining of at least said lateral wall of the cut in the workpiece are effected in a single pass.

5. The improvement of claim 4 wherein said varying of the energy of the electrical discharges of said minimum value corresponding to a maximum instantaneous value of said amplitude is effected in the course of a transverse oscillation on both sides of the centerline of the cut in said workpiece, whereby rough machining of the workpiece and finish machining of both lateral walls of the cut are effected in a single pass.

6. The improvement of claim 4 wherein said transverse oscilltion is effected along substantially semi-circular paths centered on the centerline of the cutting path.

7. In an EDM apparatus for effecting a cut by electrical discharges in a conductive workpiece by means of a travelling wire electrode, said apparatus comprising a numerical control unit for controlling a relative displacement between the workpiece and the wire electrode according to a programmed cutting path of predetermined centerline and a pulse generator providing electrical discharges at a machining zone between said workpiece and said wire electrode, the improvement comprising a data input and computation unit accepting information data representing relative oscillation of said wire electrode and said workpiece at a predetermined constant amplitude of oscillation in a direction transverse to the cutting path centerline, said data input and computation unit providing a signal representation of the instantaneous value of the amplitude of said tranverse oscillation, and a function generator circuit cooperating with said data input and computation unit for varying the energy of the electrical discharges provided by said pulse generator according to a function of the instantaneous value of the amplitude of said transverse oscillation such that maximum electrical discharge energy corresponds to the minimum instantaneous value of said amplitude of transverse oscillation and minimum electrical discharge energy corresponds to the maximum instantaneous value of said amplitude of transverse oscillation on at least one side of said path centerline, whereby said cut is rough machined in said workpiece and at least one corresponding lateral wall of the cut in said workpiece is finish machined in a single cut pass.

8. The improvement of claim 7 further comprising a pair of electrode wire guide members one disposed above and the other below said workpiece, means for displacing one of said electrode wire guide members relative to the other at predetermined amplitudes, and means for controlling the displacement of said one of said guide members such as to maintain a predetermined ratio between the amplitudes of displacement of said two electrode wire guide members.

9. The improvement of claim 7 wherein said function generator decreases the energy of said electrical discharges at each maximum instantaneous value of said transverse oscillation amplitude, whereby rough machining of the workpiece and finish machining of both lateral walls of the cut are effected in a single pass.

* * * * *

UNITED STATES PATENT AND TRADEMARK OFFICE
CERTIFICATE OF CORRECTION

PATENT NO. : 4,598,190

DATED : July 1, 1986

INVENTOR(S) : FRANCOIS BALLEYS

It is certified that error appears in the above-identified patent and that said Letters Patent is hereby corrected as shown below:

Column 4, line 11, change "semi-circulr" to --semi-circular--.

Column 6, line 13, change "oscilltion" to --oscillation--.

Column 6, line 30, change "representation" to --representative--.

Signed and Sealed this

Seventh Day of October, 1986

[SEAL]

Attest:

DONALD J. QUIGG

Attesting Officer

Commissioner of Patents and Trademarks